United States Patent
Weckström et al.

(10) Patent No.: US 6,621,910 B1
(45) Date of Patent: Sep. 16, 2003

(54) METHOD AND ARRANGEMENT FOR IMPROVING LEAK TOLERANCE OF AN EARPIECE IN A RADIO DEVICE

(75) Inventors: Anders Weckström, Lohja (FI); Jari Suutari, Halikko (FI); Juha Backman, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/166,259

(22) Filed: Oct. 5, 1998

(30) Foreign Application Priority Data

Oct. 6, 1997 (FI) .................................................. 973893

(51) Int. Cl.⁷ .............................. H04R 1/02; H04R 1/20
(52) U.S. Cl. .................... 381/351; 381/346; 381/353; 455/575; 455/550; 455/90
(58) Field of Search .............................. 381/189, 150, 381/152, 58, 371, 344, 345, 71.1, 23.1, 816, 367, 351, 353, 347, 348, 386, 370, 372, 346; 455/90, 575, 569, 550; 174/35 R; 379/430, 433.01; 361/818

(56) References Cited

U.S. PATENT DOCUMENTS

| | | | |
|---|---|---|---|
| 4,912,604 A | 3/1990 | Vaisanen ..................... 361/424 |
| 4,945,633 A | 8/1990 | Hakanen et al. ............... 29/825 |
| 5,006,667 A | 4/1991 | Lonka ....................... 174/35 R |
| 5,271,056 A | 12/1993 | Pesola et al. .................. 379/58 |
| 5,313,661 A | 5/1994 | Malmi et al. ............. 455/232.1 |
| 5,365,410 A | 11/1994 | Lonka ......................... 361/816 |
| 5,400,949 A | 3/1995 | Hirvonen et al. ...... 228/180.22 |
| 5,438,482 A * | 8/1995 | Nakamura et al. ........... 381/816 |
| 5,442,521 A | 8/1995 | Hirvonen et al. ............ 361/800 |
| 5,479,522 A * | 12/1995 | Lindemann et al. ....... 381/23.1 |
| 5,596,487 A * | 1/1997 | Castaneda et al. ........... 361/814 |
| 5,603,103 A | 2/1997 | Halttunen et al. ............. 455/90 |
| 5,687,470 A | 11/1997 | Halttunen et al. .......... 29/592.1 |
| 5,721,787 A * | 2/1998 | Neibaur et al. .............. 381/386 |
| 5,729,605 A * | 3/1998 | Bobisuthi et al. ............ 379/430 |
| 5,742,488 A | 4/1998 | Lonka et al. ................ 361/816 |
| 5,742,733 A | 4/1998 | Jarvinen ..................... 395/2.29 |
| 5,790,679 A * | 8/1998 | Hawker et al. .............. 381/163 |
| 6,002,949 A * | 12/1999 | Hawker et al. .............. 455/569 |
| 6,134,336 A * | 10/2000 | Clark .......................... 381/371 |
| 6,333,459 B1 * | 12/2001 | Sato et al. ................. 174/35 R |

* cited by examiner

Primary Examiner—Forester W. Isen
Assistant Examiner—Con P. Tran
(74) Attorney, Agent, or Firm—Perman & Green, LLP

(57) ABSTRACT

The invention relates to an arrangement for improving leak tolerance in an earpiece (100) of a radio device. The invention can be applied preferably in mobile stations. One idea of the invention is that an acoustic volume (111) is arranged behind the earpiece by taking advantage of the RF shield casing (112, 116) of a radio frequency unit of the device. By means of the invention one can form behind the earpiece an acoustic volume which loads optimally the earpiece without therefore needing to enlarge the size of the device. In an embodiment of the invention one wall of the casing arranged behind the earpiece has been formed by means of an electronic circuit board (112), to which circuit board radio frequency components (117) of an electronic unit have been connected. Then between the casing and the external volume one can preferably form an acoustic path by means of through holes (113, 114) arranged in the circuit board.

12 Claims, 3 Drawing Sheets

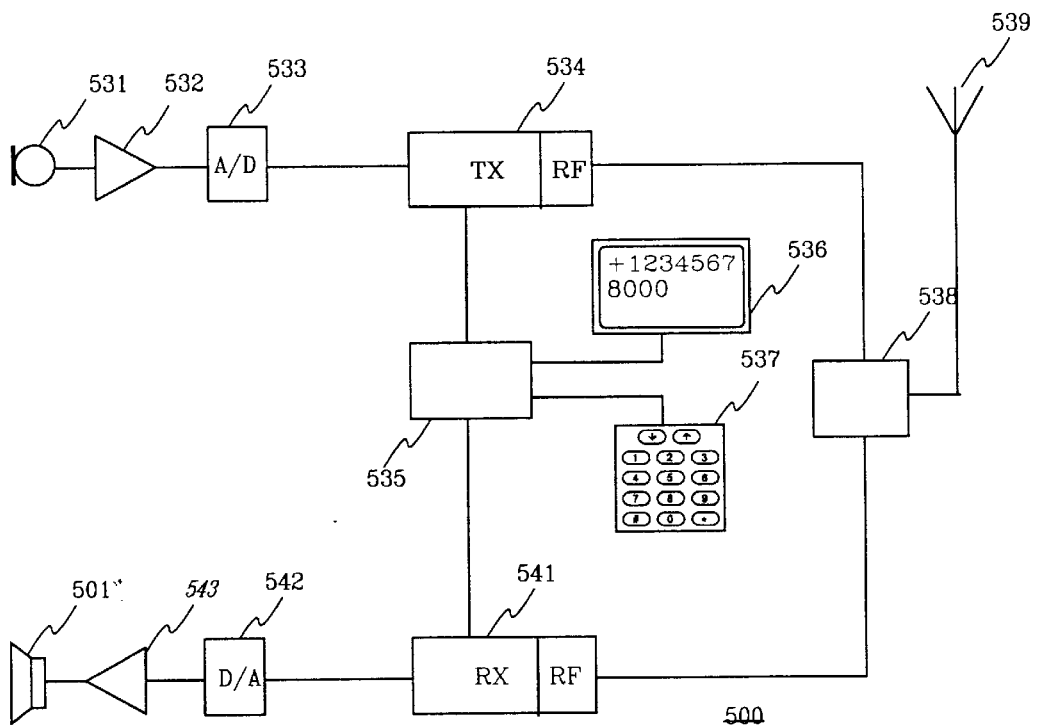
FIG. 5
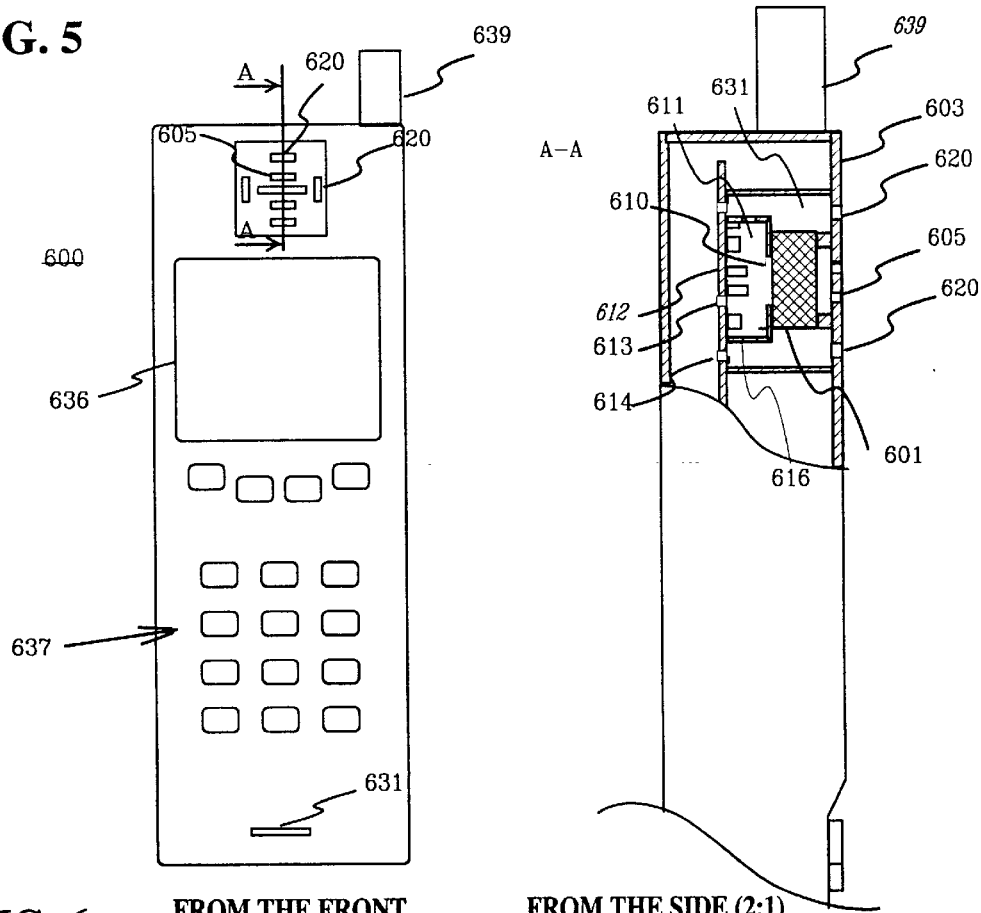
FIG. 6    FROM THE FRONT      FROM THE SIDE (2:1)

METHOD AND ARRANGEMENT FOR IMPROVING LEAK TOLERANCE OF AN EARPIECE IN A RADIO DEVICE

CROSS-REFERENCES TO RELATED APPLICATION

Not applicable

STATEMENT REGARDING FEDERALLY SPONSORED RESEARCH OR DEVELOPMENT

Not applicable

BACKGROUND OF THE INVENTION

1. Field of the Invention

The invention relates to a method and an arrangement for improving leak tolerance in an earpiece of a radio device. The invention can be applied preferably in teleterminals, particularly in mobile stations.

2. Description of Related Art Including Information Disclosed Under 37 CFR 1.97 and 1.98

Teleterminals conventionally contain a receiver part which has an earpiece for reproducing the received acoustic signal. The earpiece has been conventionally designed in such a way that it forms the maximum sound volume and the best quality of sound when the earpiece is sealed against the user's ear. If there is a gap, i.e. a leak between the earpiece and the user's ear, this usually causes a significant weakening of the sensed sound pressure. Additionally, the frequency distribution of the sensed sound does not then correspond to the original acoustic signal but low frequencies are attenuated to a greater extent than high frequencies. The ability of an earpiece to maintain its acoustic properties when the gap between the earpiece and the ear changes, is called its leak tolerance.

The problem described above is extremely serious particularly in mobile stations, because the mobile station is rarely completely sealed against the user's ear. On the other hand, standards relating to mobile stations are primarily based on measurements where the gap between the mobile station and the artificial ear has been arranged so that there is a tight seal. In order to ensure that the volume and frequency distribution of the reproduced sound are according to specifications also in real operating conditions, extremely good leak tolerance is required from the earpiece arrangement.

To improve leak tolerance the following ways are prior known. The leak tolerance can be improved by arranging a loose coupling to the membrane which produces the sound waves in the earpiece capsule and by loading it by a relatively large volume situated behind the earpiece capsule. Most preferably the volume behind the earpiece capsule has been arranged to be open, in which case the aforementioned volume becomes as large as possible. Another way to improve the leak tolerance is to lower the acoustic output impedance of the arrangement by using an acoustic return path.

A disadvantage of the solutions according to prior art is that the load caused by the acoustic return path is difficult to optimize. The leak tolerance to be achieved depends essentially on the size of the volume arranged behind the earpiece capsule. In small-sized devices, such as mobile stations, it is difficult to provide a sufficiently large volume to achieve the optimum acoustic load, because the electronical units of the device occupy the volume within the casing of the device.

The aim of the present invention is to devise an earpiece solution which achieves good leak tolerance in a small-sized radio device, such as a mobile station.

BRIEF SUMMARY OF THE INVENTION

One idea of the invention is that an acoustic volume is arranged behind the earpiece by taking advantage of the RF shield casing of the radio frequency unit of the device. The aim of the RF shield is to prevent radio frequency signals formed by a radio device, such as a mobile station, from entering the surroundings and to prevent disturbances in the RF circuits of the device caused by RF radiation which is present in the surroundings. According to the invention, an RF shielded volume of this kind is exploited as an acoustic volume loading the earpiece.

A particular advantage of the invention is that an acoustic volume which is loading the earpiece optimally can be formed behind the earpiece without it causing any necessary enlargement in the size of the device.

In one embodiment of the invention, one wall of the casing arranged behind the earpiece has been formed by means of an electronic circuit board to which circuit board radio frequency components of the electronic unit have been connected. Then between the casing and the external volume, an acoustic path can preferably be formed by means of through holes arranged in the circuit board.

A method according to the invention for improving leak tolerance in an earpiece of a radio device such that the sound formed by an earpiece capsule is directed from the front part of the earpiece capsule to the first acoustic volume which is confined by the user's ear and the housing part between the earpiece capsule and the ear, is characterized in that the sound formed by the earpiece capsule is additionally directed from the back part of the earpiece capsule to a radio shielded volume of the radio device which is confined by a casing and operates as the second acoustic volume.

An arrangement according to the invention for improving leak tolerance of an earpiece in a radio device, which arrangement comprises an earpiece capsule, a housing part situated between the earpiece capsule and the user's ear for confining the first acoustic volume between said housing part and user's ear and the first acoustic path arranged between the front part of the earpiece capsule and the first acoustic volume for directing sound from the front part of the earpiece capsule to said acoustic volume, is characterized in that it comprises additionally a radio shielded volume confined by a casing and arranged for the RF parts of a radio device and the second acoustic path for directing sound formed by the earpiece capsule from the back part of the earpiece capsule to said radio shielded volume.

A mobile station according to the invention, whose earpiece comprises an earpiece capsule, a housing part situated between the earpiece capsule and the user's ear for confining the acoustic volume between said housing part and user's ear and the first acoustic path arranged between the front part of the earpiece capsule and said acoustic volume for directing sound from the front part of the earpiece capsule to said acoustic volume, is characterized in that the arrangement comprises additionally a radio shielded volume confined by a casing and arranged for the RF parts of the mobile station and the second acoustic path for directing sound formed by the earpiece capsule from the back part of the earpiece capsule to said radio shielded volume for improving the leak tolerance of the earpiece.

Preferable embodiments of the invention have been presented in dependent claims.

By the front and back parts of the earpiece capsule one means herein the front and back parts of a membrane which forms sound waves and is situated in the earpiece capsule, and sound waves generated in these front and back parts are in opposite phases from each other.

By the earpiece one means herein the earpiece capsule and acoustic and mechanical structures connected to it.

BRIEF DESCRIPTION OF THE SEVERAL VIEWS OF THE DRAWINGS

In the following the invention is described in more detail by means of the attached drawings in which FIG. 5 shows a block diagram of a prior known mobile station to which the present invention can preferably be applied and FIG. 6 shows a front view and a side view of a mobile station according to the invention.

DETAILED DESCRIPTION OF THE INVENTION

Figure 1:
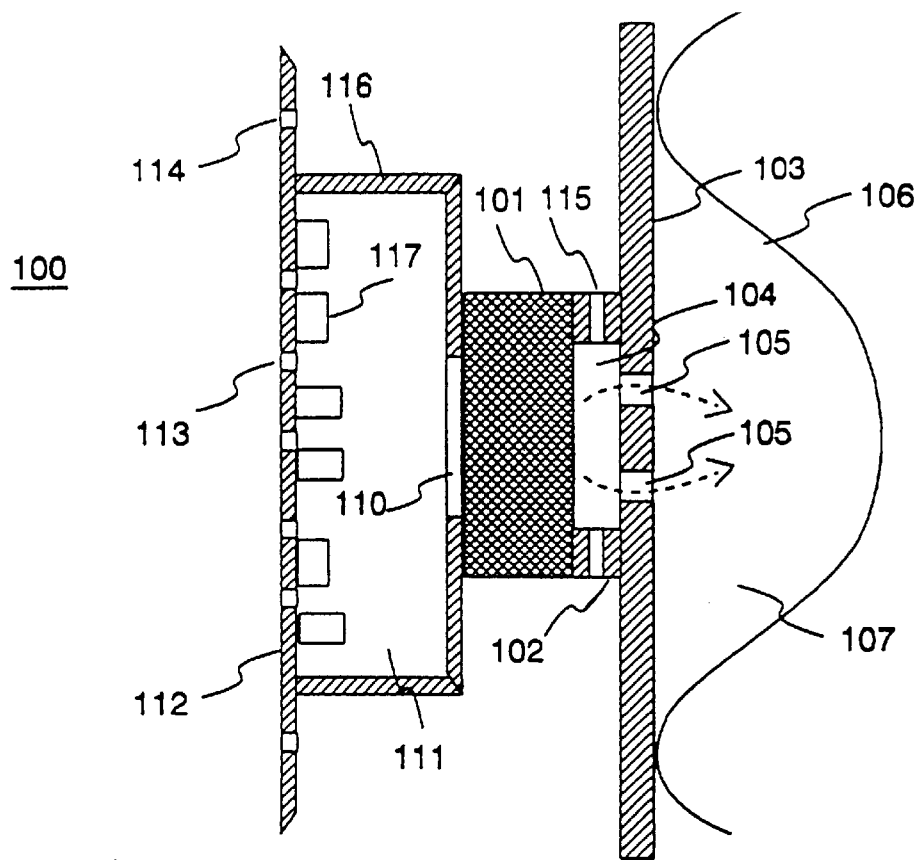
FIG. 1 shows an earpiece arrangement according to the invention for improving leak tolerance of an earpiece.

FIG. 1 shows an earpiece 100 according to the invention. It comprises an earpiece capsule 101 which converts an electric signal into an acoustic sound. The earpiece capsule 101 is connected to the housing 103 of the earpiece by its edges 102. The sound wave formed by the earpiece capsule is generated in the volume 104 between the earpiece 101, the edges 102 and the housing 103, from which it is transferred to the external volume of the housing through holes 105. Between the housing 103 and the ear 106 there remains a volume 107 which thus in an optimal situation is closed. If the earpiece is a part of a mobile station, the housing 103 is preferably the cover of the mobile station.

In the solution shown in FIG. 1, leak tolerance has been improved by arranging an acoustic volume 111 behind the earpiece capsule. From the earpiece capsule, acoustic connection has been arranged to said volume by means of one or more holes 110 situated in the back part of the earpiece capsule. The acoustic volume has been confined by means of a casing which consists of an RF shield 116 and a circuit board 112. The RF shield 116 has been manufactured from some electrically conductive material, such as a metal plate. The circuit board 112 has preferably holes which connect acoustically the volume 111 to the volume surrounding it. In the circuit boards, holes with plated-through edges are used to electrically connect wires to each other, these wires being situated on different foil layers of the circuit board. These approximately 0.2 mm diametral holes can be used for forming said acoustic path. FIG. 1 shows also RF components 117 of a radio frequency unit which have been connected to the circuit board 112.

The acoustic return path of the earpiece capsule can thus be arranged via the volume which surrounds the entire device, but FIG. 1 also shows a way to arrange an internal acoustic return path of the device. This acoustic return path consists of a hole 110 in the back part of the earpiece capsule, an acoustic volume 111 behind the earpiece capsule, holes 113 in the circuit board at the position of the RF shield casing, holes 114 in the circuit board outside the RF shield casing, a volume between the circuit board and the housing part and holes 115 at the front edge of the earpiece capsule. The volume arranged for said acoustic return path between the circuit board and the housing part can additionally be confined by a special second casing, but the volume can also consist of a normal casing of the device, such as a mobile station, and the components inside it.

The ability to improve leak tolerance in the solution shown in FIG. 1 is based on the fact that the acoustic volume arranged behind the earpiece and the acoustic return path arranged through it, operate as an acoustic load of the earpiece capsule especially at low frequencies, in which case the changes in external load have a smaller relative effect on the acoustic total load of the earpiece capsule.

Figure 2:
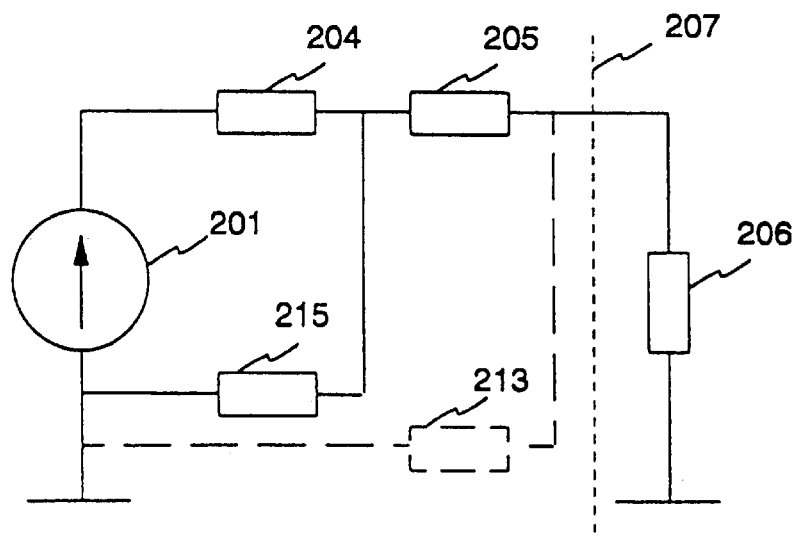
FIG. 2 shows an acoustic equivalent circuit of the earpiece arrangement according to FIG. 1.

FIG. 2 shows an acoustic equivalent circuit of an earpiece according to FIG. 1. In it, the earpiece capsule forms a pressure wave and operates as an acoustic source 201 and comprises an internal impedance 204. The pressure wave propagates to the outside of the earpiece arrangement through holes in the casing, such that the holes form an impedance 205 and the external volume forms a load impedance 206. The interface between the earpiece and the external volume has been marked by 207 in FIG. 1. The acoustic return path formed by the volume surrounding the device operates as a feedback impedance 213, and the internal acoustic return path of the device operates as a feedback impedance 215. The load impedance 206 consists mainly of the load caused by the ear and the load resulting from the leak between the earpiece and the ear. From the equivalent circuit one can notice that the feedback impedances reduce the effect of the changes in the load impedance 206 on the acoustic power which is transferred to the load. The feedback impedance 213 has been marked with dashed lines, which shows its relatively minor compensating effect compared with the feedback impedance 215.

Figure 3:
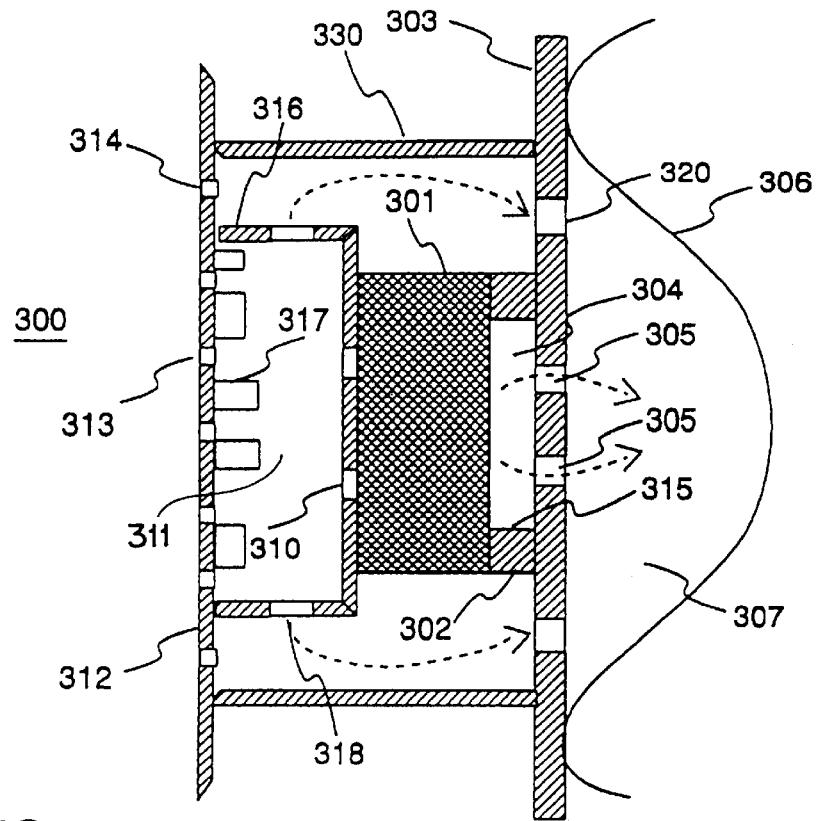
FIG. 3 shows another arrangement according to the invention for improving leak tolerance of an earpiece.

FIG. 3 shows another embodiment according to the invention for improving leak tolerance of an earpiece. It comprises an earpiece capsule 301 which converts an electric signal into an acoustic sound. The earpiece capsule 301 is connected to the housing part 303 of the earpiece by its edges 302. The sound wave formed by the earpiece capsule is generated in the volume 304 between the earpiece capsule 301, the edges 302 and the housing part 303, from which it is transferred to the external volume of the housing through holes 305 which form the first acoustic path. Between the housing part 303 and the ear 306 the first volume 307 is confined. If the earpiece is a part of a mobile station, the housing part is preferably the cover of the mobile station.

In the solution shown in FIG. 3 leak tolerance has been improved according to the invention by arranging an acoustic volume loading the earpiece capsule behind the earpiece capsule. The acoustic volume operates also as an RF shielded volume of a radio frequency unit. The acoustic volume has been confined by means of a casing which consists of an RF shield 316 and a circuit board 312. The sound formed by the earpiece capsule 301 has been directed to an acoustic volume 311 through holes 310. The circuit board 312 has preferably holes 313, 314 which combine the acoustic volume 311 to the volume surrounding it. FIG. 3 shows also RF components 317 of a radio frequency unit which have been coupled to the circuit board 312.

In the embodiment shown in FIG. 3 an acoustic return path has been arranged from the back part of the earpiece capsule 301 to the first volume 307. For this acoustic path there can be holes 318 in the RF shield 316 or alternatively, the acoustic return path can be directed through the holes 313, 314 in the circuit board 312. For said acoustic return path, holes 320 have been additionally arranged in the housing part of the earpiece.

The volume arranged on the sides of the earpiece capsule has been closed by a special casing 330 in the solution of FIG. 3. Volumes 311 and 331 need not, however, necessarily be volumes separated from each other, but they can form one combined RF shielded volume.

The ability to improve leak tolerance in the solution shown in FIG. 3 is based on the fact that the acoustic return path arranged particularly for low frequencies operates as an acoustic load for the earpiece capsule at low frequencies, in which case the changes in external load have a smaller relative effect on the acoustic total load of the earpiece capsule. When the acoustic return path has been directed to the volume between the ear and the housing part, it is possible to use the small volume behind the earpiece capsule and still gain the optimum load at low frequencies. Thus, for example, when applied to a mobile station, even this arrangement according to the invention does not cause any significant enlargement in the size of the mobile station or have any effect on its shape.

The holes 320 of the housing part 303 which have been arranged for forming the second acoustic path are preferably in the same size range as the holes 305 arranged for the first acoustic path. Thus neither embodiment of the invention has any significant impact on the appearance of the device.

Figure 4:
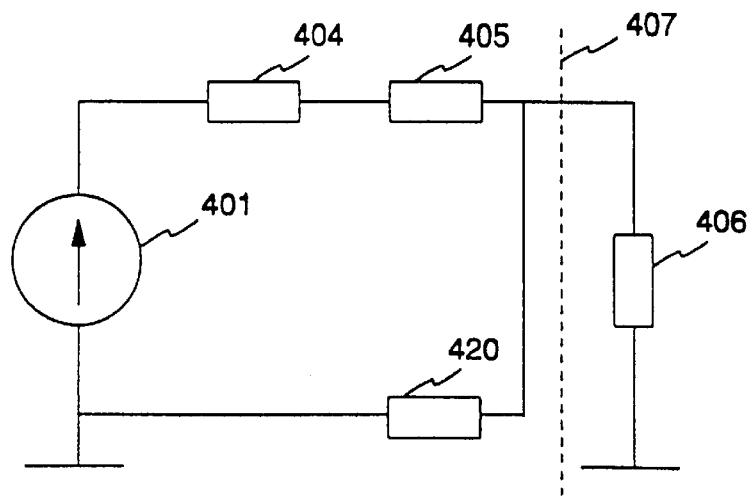
FIG. 4 shows an acoustic equivalent circuit of the earpiece arrangement according to FIG. 3.

FIG. 4 shows a simplified acoustic equivalent circuit of an earpiece according to FIG. 3. In it, the earpiece capsule forms a pressure wave and functions thus as an acoustic source 401 to which an internal impedance 404 is further connected. The pressure wave propagates to the outside of the earpiece arrangement through the holes in the casing, in which case the holes form an acoustic impedance 405 and the external volume forms a load impedance 406. The interface between the earpiece and the external volume has been marked by 407 in FIG. 4. The acoustic return path directed between the user's ear and the housing part operates herein as a feedback impedance 420. From the equivalent circuit, one can notice now that the effects of the changes in the load impedance 406 on the acoustic power which is transferred to the load can be minimized by means of a feedback impedance 420, because the feedback impedance compensates for the effect of the holes 305 in the casing, that is the effect of the acoustic impedance 405. If this embodiment of the invention is compared with the solution shown in FIG. 2, one can further notice that to achieve a certain pressure level (corresponding to the voltage of an electric circuit) to the listener's ear 406 at a certain impedance value seen from the acoustic source, less acoustic volume velocity (corresponding to current in an electric circuit) is needed in the second embodiment of the invention in which the effect of the feedback impedance 420 is greater than that of the feedback impedance 213 in FIG. 2. This means that in order to achieve a certain audibility level, less movements of the membrane in the earpiece capsule are needed.

Next, the application of the present invention to a mobile station is studied. At first, by means of FIG. 5, the operation of a conventional mobile station is described and thereafter, the mechanical structure of a mobile station according to the invention is described by means of FIG. 6.

FIG. 5 shows a block diagram of a mobile station according to an embodiment as an example of the invention. The mobile station comprises the parts which are typical of the device, such as a microphone 531, a keyboard 537, a display 536, an earpiece 501, a trans mission/reception coupling 538, an antenna 539 and a control unit 535. Additionally, the figure shows transmission and reception blocks 534, 541 which are typical of the mobile station.

The transmission block 534 comprises operations needed for speech coding, channel coding, ciphering and modulation, and RF operations. The reception block 541 comprises corresponding RF operations and operations needed for demodulation, deciphering, channel decoding and speech decoding. A signal which comes from the microphone 531, which has been amplified at an amplification stage 532 and converted into a digital form in an A/D converter is transferred to the transmission block 534, typically to a speech coding element included in the transmission block. The transmission signal which has been shaped, modulated and amplified by the transmission block is directed via the transmission/reception coupling 538 to the antenna 539. The signal to be received is brought from the antenna via the transmission/reception coupling 538 to the reception block 541 which demodulates the received signal and performs the deciphering and channel decoding. The speech signal received as a final result is transferred via a D/A converter 542 to an amplifier 543 and further to an earpiece 501. The control unit 535 controls the operation of the mobile station, reads control commands given by the user from the keyboard 537 and delivers messages to the user via the display 536.

The parts of the mobile station to be RF shielded are included in blocks 538, 534 and 541. The RF parts of the transmission block 534 and the reception block 541, such as circuits forming the RF frequency signals, can also be partially common to the transmission and reception chains.

When an earpiece arrangement according to the invention is used, the frequency response of the earpiece may differ from the frequency response of the arrangement according to prior art. The frequency response can be compensated analogically by using a filter which is included in the amplifier 543. Another alternative is to perform the compensation in the context of digital signal processing in the digital signal processor (DSP) of block 541. When the frequency response is corrected on the digital signal processor, component changes are not necessarily needed, but the correction can be performed by making the necessary additions to the program which controls the digital signal processor.

FIG. 6 shows a mechanical structure of a mobile station 600 according to the invention viewed from the front and the side. The side view has been enlarged by 2:1 compared to the front view and it shows a partial cross section A—A at the position of an earpiece according to the invention. The front view shows a microphone 631, a keyboard 637, a display 636 and an antenna 639 which are included in a conventional mobile station. On the top part of the mobile station one can see holes 605 which form the first acoustic path leading from the front part of the earpiece capsule to the outside of the device and holes 620 which are a part of the second acoustic path. In the cross-sectional view, one can additionally see an RF shielded volume 611 which has been arranged behind the earpiece capsule. The volumes 611 and 631 need not necessarily be separated but they can also form a combined volume. The housing of the earpiece between the earpiece and the user's ear is in the mobile station preferably the cover 603 of the device to which other mechanical parts of the earpiece are connected.

As one can see in FIG. 6, both the earpiece and the antenna are situated in the top part of the mobile station. Since the RF parts are directly connected to the antenna circuit, the locating of the RF shield in the context of the earpiece is also RF technically a good solution.

Above, some embodiments of the solution according to the invention have been described. The principle according to the invention can naturally be modified within the frame of the scope defined by the claims, for example, by modification of the details of the implementation and ranges of use.

What is claimed is:

1. A method for improving leak tolerance in an earpiece of a radio device, at which the sound formed by an earpiece capsule is directed from the front part of the earpiece capsule to a first acoustic volume which is confined by the user's ear and a housing part between the earpiece capsule and the ear, characterized in that the sound formed by the earpiece capsule is directed additionally from the back part of the earpiece capsule to a radio shielded volume of the radio device, and this volume is confined by a casing and it operates as the second acoustic volume.

2. An arrangement comprising:
   an earpiece capsule,
   a housing part between the earpiece capsule and the user's ear for confining a first acoustic volume between said housing part and user's ear,
   a first acoustic path arranged between the front part of the earpiece and the first acoustic volume for directing sound from the front part of the earpiece capsule to said acoustic volume, and
   means for improving leak tolerance by reducing the effect of changes in load impedance on the acoustic power which is transferred to said user's ear, including
   a radio shielded volume arranged for the RF parts of a radio device and confined by a casing, and
   a second acoustic path for directing the sound formed by the earpiece capsule from the back part of the earpiece capsule to said radio shielded volume.

3. An arrangement according to claim 2, characterized in that said casing comprises a circuit board.

4. An arrangement according to claim 3, characterized in that said circuit board comprises holes for arranging an acoustic path from said second acoustic volume to the volume surrounding it.

5. An arrangement according to claim 1, characterized in that the earpiece capsule comprises holes for arranging an acoustic return path from the volume surrounding the earpiece capsule to the front part of the earpiece capsule.

6. An arrangement according to claim 1, characterized in that it comprises an acoustic return arranged from the back part of the earpiece capsule to said first volume.

7. A mobile station whose earpiece comprises:
   and earpiece capsule,
   a housing part between the earpiece capsule and the user's ear for confining an acoustic volume between said housing part and user's ear,
   a first acoustic path arranged between the front part of the earpiece capsule and said acoustic volume for directing sound from the front part of the earpiece capsule to said acoustic volume, and
   means for improving leak tolerance by reducing the effect of changes in load impedance on the acoustic power which is transferred to said user's ear, including
   a radio shielded volume arranged for the RF parts of a mobile station and confined by a casing, and
   a second acoustic path for directing the sound formed by the earpiece capsule from the back part of the earpiece capsule to said radio shielded volume.

8. A mobile station according to claim 7, characterized in that said housing part is the cover of the mobile station.

9. A mobile station according to claim 7, characterized in that it comprises means for compensating frequency response of the earpiece by means of digital signal processing.

10. A mobile station according to claim 7, characterized in that it comprises means for compensating frequency response of the earpiece by analog filtering.

11. An arrangement according to claim 2, wherein said second path comprises said casing having at least one hole in the material thereof.

12. A mobile station according to claim 7, wherein said second path comprises said casing having at least one hole in the material thereof.

* * * * *